United States Patent Office 3,393,227
Patented July 16, 1968

3,393,227
PURIFICATION OF HYDROXYALKYL
CARBAMATES
Floyd E. Bentley, Austin, Tex., assignor to Jefferson Chemical Company, Inc., Houston, Tex., a corporation of Delaware
No Drawing. Filed Feb. 12, 1965, Ser. No. 432,406
4 Claims. (Cl. 260—482)

ABSTRACT OF THE DISCLOSURE

In the manufacture of hydroxyalkyl carbamates by the reaction of an alkylene carbamate with ammonia impurities are formed as by-products of this reaction which interfere with subsequent methylolation reactions. These impurities can be removed by treating the crude hydroxyalkyl carbamate with an alkaline material followed by neutralization by the addition of an acid. Water, other low-boiling components and precipitated solids are removed from the hydroxyalkyl carbamate.

This invention is concerned with the purification of hydroxyalkyl carbamates. More particularly, this invention is concerned with the purification of hydroxyalkyl carbamates prepared by the reaction of an alkylene carbonate with ammonia by treatment with an alkaline material.

In United States Patent No. 2,627,524, there is described a method for the preparation of hydroxyalkyl carbamates by the reaction of an alkylene carbonate with ammonia. It has recently been discovered that the methylolated hydroxyalkyl carbamates are valuable reagents for imparting wrinkle resistance to cellulosic fabrics as described, for example, in copending application Ser. No. 432,385 filed of an even date herewith. The metyhlolated derivatives are obtained by the reaction of the hydroxyalkyl carbamate with formaldehyde in an aqueous alkaline medium. However, the hydroxyalkyl carbamates prepared in accordance with the procedure of United States Patent No. 2,627,524 contain one or more impurities which interfere with the methylolation reaction, thereby making it difficult to attain a high degree of substitution.

Heretofore, it has not been possible to remove satisfactorily these contaminants. The level of contaminants may be substantially reduced by vacuum distillation of the product; however, this is inconvenient because of the high boiling points involved and does not completely solve the problem.

I have now discovered that the interfering impurities can be removed by treating the crude hydroxyalkyl carbamate with an alkaline material selected from the group consisting of alkali metal hydroxides and alkaline earth metal hydroxides. This treatment is preferably conducted in an aqueous medium. The alkaline mixture is then neutralized, and low-boiling components and inorganic salts are removed.

The alkaline material to be used in the purification of the hydroxyalkyl carbamates is an alkali metal hydroxide or an alkaline earth metal hydroxide. Examples of such hydroxides are sodium hydroxide, potassium hydroxide, barium hydroxide, calcium hydroxide and strontium hydroxide. The preferred hydroxides are sodium hydroxide and potassium hydroxide. From about 1% to about 10% alkaline material is employed, based on the weight of crude hydroxyalkyl carbamate. Temperature is unimportant and may be between 20° and 150° C.

After substantially all the impurities have reacted, a period of from about 15 minutes to about 4 hours, the mixture is neutralized by the addition of an acid. Virtually any acid may be used. Suitable acids include the mineral acids, such as hydrochloric acid, sulfuric acid and phosphoric acid as well as readily available organic acids such as acetic acid, oxalic acid, adipic acid, etc. Sufficient acid should be added to bring the pH of the solution to 7.

After the mixture has been neutralized, water and other low-boiling components are removed, such as by a stripping operation. This operation is preferably conducted at a reduced pressure so that lower temperatures may be employed. The preferred stripping temperature will vary somewhat with the hydroxyalkyl carbamate being purified. In general, it may be said that an overhead temperature of less than about 150° C. at a pressure of 0.1 to 10 mm. will be adequate.

After removal of the water, the salts formed during neutralization will precipitate and should be removed by filtration, centrifugation or other known means. Since some of the hydroxyalkyl carbamates, such as, for example, hydroxyethyl carbamate, are solids, it may be necessary to conduct the salt removal at an elevated temperature.

My invention will be further illustrated by the following specific examples.

EXAMPLE I

A 150 g. sample of crude hydroxethyl carbamate prepared by the action of ammonia on ethylene carbonate was placed in a glass-stoppered flask and treated with a solution of 4 grams of sodium hydroxide dissolved in 10 ml. of water. The mixture was thoroughly mixed and allowed to stand at room temperature for one hour. The mixture was brought to a pH of 7 by the addition of concentrated hydrochloric acid. Water, ethylene glycol and other low boilers were stripped from the mixture until the overhead temperature was 125° C. at a pressure of 0.5 mm. The precipitated salt was removed by filtration. The product crystallized on cooling to a white solid.

EXAMPLE II

A comparison was made of the methylolation reaction for the purified carbamate of Example I, a carbamate purified by vacuum distillation and an unpurified carbamate. The methylolation procedure consisted of preparing a solution of 105 g. of the carbamate, 183 g. of 37% aqueous formalin solution and 42 ml. of distilled water. The solution was warmed to 45° C., and the pH was adjusted to 9.6 by the addition of one molar sodium hydroxide solution. The reaction vessel was held at a constant temperature of 45° C. After two hours, a 1 g. sample was titrated for free formaldehyde using the sodium sulfite method (Morath and Woods, Anal. Chem. 30, 1437–40 (1958)), and the ratio of mols of formaldehyde consumed per mol of carbamate was calculated. The results are given in the following table.

| Treatment of Carbamate | Kjeldahl N | | Final pH During Methylolation | Mols HCHO Consumed per Mol Carbamate |
|---|---|---|---|---|
| | Calculated | Found | | |
| Caustic treated | 13.33 | 13.55 | 9.2 | 1.51 |
| Distilled | 13.33 | 13.35 | 8.0 | 1.07 |
| Crude | 13.33 | 12.72 | 8.0 | 0.61 |

It can be seen from the data in the table that the degree of substitution obtained for the sample treated in accordance with the present invention was considerably higher than that obtained for the carbamate purified by distillation. This high degree of methylolation is essential if the methylolated hydroxyalkyl carbamate is to be satisfactory for use in the preparation of wrinkle resistant cellulosic fabrics.

Having thus described my invention, I claim:
1. A method for removing impurities from crude hydroxyalkyl carbamates prepared from alkylene carbonates and ammonia which comprises treating the crude hydroxyalkyl carbamate with from about 1 to about 10 wt. per- cent of an alkaline material selected from the group consisting of alkali metal hydroxides and alkaline earth metal hydroxides, neutralizing the mixture and removing low-boiling components and inorganic salts.

2. A method as in claim 1 wherein the alkaline material is sodium hydroxide.

3. A method as in claim 1 wherein the alkaline material is potassium hydroxide.

4. A method as in claim 1 wherein the treatment is in an aqueous medium for a period of time of from about 15 minutes to about 4 hours.

References Cited

UNITED STATES PATENTS

| | | | |
|---|---|---|---|
| 2,627,524 | 2/1953 | Malkemus | 260—482 |
| 2,802,022 | 8/1957 | Groszos et al. | 260—482 XR |
| 3,226,428 | 12/1965 | Vail et al. | 260—482 |
| 3,230,030 | 1/1966 | Moran et al. | 8—116.3 |

OTHER REFERENCES

Reid et al.: "Some Aspects of the Preparation of Dimethylol Monoalkyl Carbamates and Their Reaction With Cellulose," reprint of paper presented Sept. 23, 1964, during the 1964 AATCC National Convention at the Statler Hilton Hotel, New York, N.Y. (7 pages).

LORRAINE A. WEINBERGER, *Primary Examiner.*

A. P. HALLIUM, *Assistant Examiner.*